Patented June 28, 1949

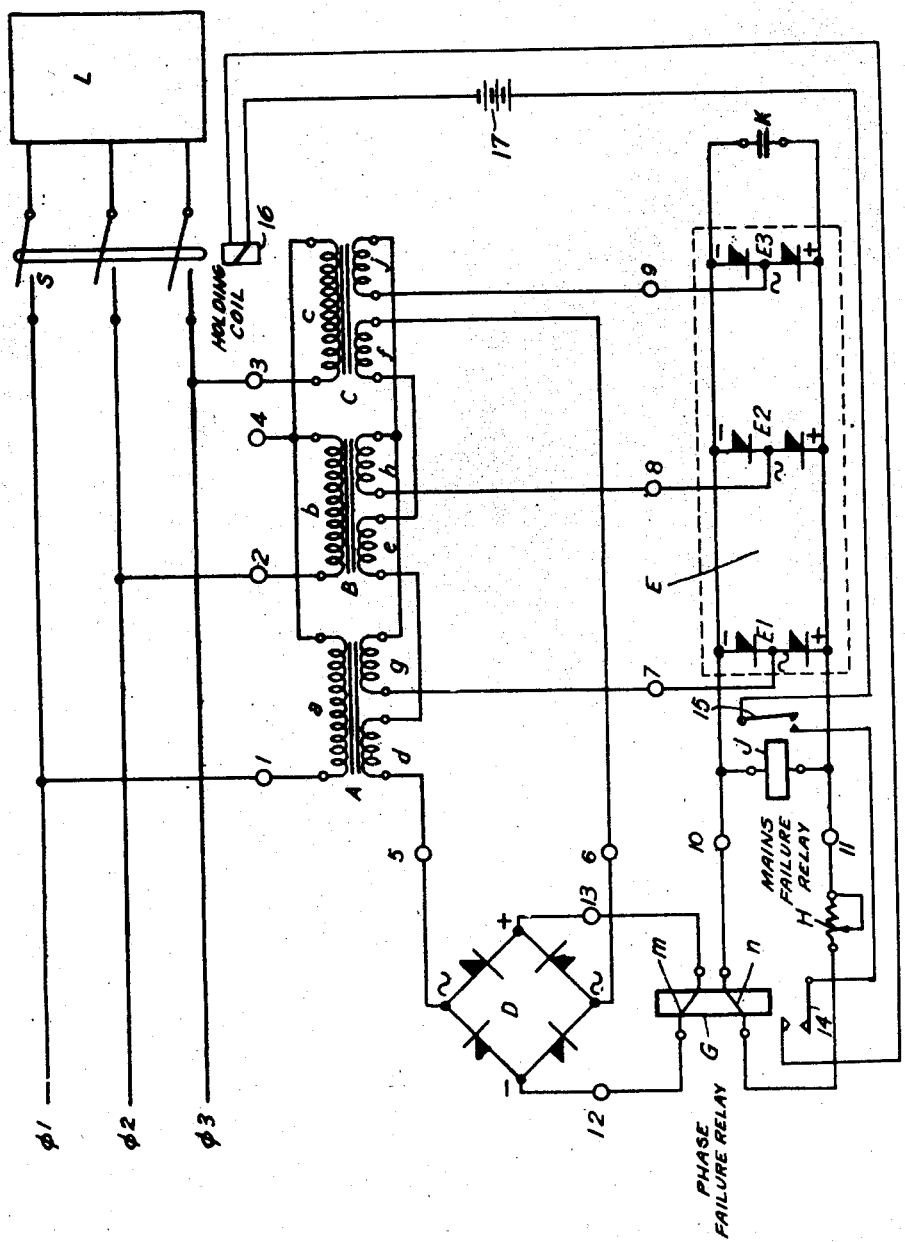

2,474,290

UNITED STATES PATENT OFFICE 2,474,290

PHASE FAILURE INDICATING DEVICE FOR POLYPHASE SYSTEMS

Victor John Terry and Richard Kelly, London, England, assignors, by mesne assignments, to International Standard Electric Corporation, New York, N. Y., a corporation of Delaware Application November 2, 1944, Serial No. 561,620
In Great Britain October 26, 1943

Section 1, Public Law 690, August 8, 1946
Patent expires October 26, 1963

5 Claims. (Cl. 175—294)

The present invention relates to phase failure indicating arrangements for three-phase electric power supply systems with particular application to the case where the neutral conductor is not accessible.

In cases where power for electrical apparatus is derived from a three-phase system, it is sometimes necessary that an indication should be given of the failure of one or more phases of the supply. This requirement may apply particularly when the electrical apparatus is located at a station which is normally unattended since the action to be taken may depend on the nature of the failure. It is often also desirable or necessary that the indicating arrangements should be voltage operated rather than current operated, and when the neutral conductor is not available, the arrangements necessary for satisfying all these requirements have hitherto been complicated.

The invention therefore provides a phase failure indicating arrangement for a three-phase electric power supply circuit comprising three primary transformer windings connected in star formation to the supply circuit and three corresponding secondary transformer windings connected in a local circuit including a phase failure relay, means to generate in the said secondary windings voltages at the third harmonic of the supply frequency, the connections of the said primary and secondary windings being so arranged that when the supply circuit is operating normally a resultant third harmonic voltage for operating the relay is produced in the local circuit with substantially no voltage at the fundamental frequency.

In many cases it is further desirable to provide a separate indication for a complete (or substantially complete) failure of the supply. A subordinate feature of the invention provides additional secondary windings connected in such a manner as to produce a resultant voltage at the fundamental frequency, and means for applying the said resultant voltage to operate a mains failure relay.

An embodiment of the invention will be described, of which a schematic circuit diagram is shown on the accompanying drawing.

This embodiment is a voltage operated device applicable to a three-phase system, whether the neutral conductor is available or not. It can be adapted to open a load circuit on the failure of one or more of the phases while at the same time giving an indication of the failure. It also comprises separate means which gives an indication only when there is a complete failure of the supply, or at least when all but one of the phases have failed. When the fault is cleared, the device returns automatically to normal and can be arranged to reconnect the load. It should be pointed out, however, that the device is principally intended for rectifier loads, or loads of a generally resistive nature, and for reasons which will be apparent later, would not be suitable for cases where the load is a three-phase induction motor or any like circuit capable of regenerating the voltage of a disconnected phase.

The drawing shows a main supply line of which the three-phase conductors are designated $\phi_1$, $\phi_2$ and $\phi_3$, respectively. The neutral conductor is not shown, since it is supposed not to be available. The phase conductors are connected through the respective contacts of a main switch S to the load L, which is supposed to be of a substantially resistive nature and may, for example, be connected to the supply line through a three-phase transformer (not shown) of which the primary windings may be in star or delta connection.

According to the invention, three similar transformers A, B, C have their primary windings $a$, $b$ and $c$ connected at terminals 1, 2 and 3 in star formation to the three-phase conductors $\phi_1$, $\phi_2$ and $\phi_3$ on the line side of the switch S. These transformers each have two secondary windings; $d$, $g$; $e$, $h$; and $f$, $j$; respectively. Windings $d$, $e$ and $f$ are similar and are connected in a simple series-aiding circuit to the A. C. input terminals 5, 6 of a single phase bridge rectifier D. Windings $g$, $h$ and $j$ are also alike, and are connected at terminals 7, 8 and 9 in star formation to a three-phase bridge rectifier E comprising three pairs of rectifiers E1, E2 and E3 connected across the D. C. output terminals 10, 11, to which is connected the winding of a mains failure relay J, which is also shunted by the condenser K.

The D. C. output terminals 12, 13 of the single phase bridge rectifier D are connected to a mains winding $m$ of a phase failure relay G. This relay also has a bias winding $n$ connected across the relay J in series with an adjustable resistance H.

According to the invention, the transformers A, B and C should have magnetic cores, such as the saturable type, designed so that they generate a large third harmonic of the fundamental supply frequency in the windings $d$, $e$ and $f$. When all the phases are normally operating, the voltages at the fundamental supply frequency induced in the windings $d$, $e$ and $f$ will be at relative phases of 0, $2\pi/3$ and $4\pi/3$, and since these windings are connected in series aiding, the three voltages will be added together vectorially, and the result will therefore be zero. Thus the voltage at the fundamental frequency applied at terminals 5 and 6 to the bridge D is zero.

In the case of the third harmonic, however, the result is different, because the third harmonic voltages generated in the three transformers will be in relative phases 0, $2\pi$ and $4\pi$, which means they will effectively combine in the same phase to produce a resultant voltage at the terminals 5 and 6. This voltage will be rectified by the bridge rectifier D and will maintain the relay G operated through the winding $m$.

If now the phase $\phi_3$ be supposed to be open circuited, the contribution of the transformer C is reduced to zero and A and B now act in opposition across the phases $\phi_1$ and $\phi_2$ so that no voltage at the fundamental or harmonic frequency is applied to terminals 5 and 6. Relay G accordingly releases, and can be arranged to give an indication of failure of the phase.

The windings $g$, $h$ and $j$ being connected in star formation to the rectifiers E will produce a resultant rectified fundamental frequency voltage to maintain the relay J operated so long as at least two of the phases are functioning. When two phases have failed, relay J releases and can be made to give a corresponding indication. Thus relay G releases if any one of the phases fails, but relay J only if two of them fail simultaneously.

The above explanation assumes that the failure of a phase corresponds to a complete disconnection. In practice, this is not always the case and what generally occurs is only a (usually considerable) reduction in the voltage of the phase. The resulting voltage may depend on the nature of the load L, and on the nature of the fault. Thus even in the case of a complete disconnection, the load may generate a voltage on the disconnected wire, which in the case of a large and efficient induction motor is substantially equal to the original voltage of the phase, and therefore as already mentioned, the device would not detect the fault. In the case of a resistive load connected by a three-phase transformer, the generated voltage would be zero. If, however, the disconnected phase is earthed, a voltage may still be generated in this condition which is of the order of one quarter of the normal voltage.

Furthermore, the variation in the voltage of a commercial supply is often about $+10\%$, and it is therefore necessary to arrange so that the circuit will give the proper indications in all the circumstances just explained, and having regard also to commercial variations of relays, transformers, rectifiers, etc. For this purpose the bias winding $n$ is provided on the relay G. The current in this winding is arranged to oppose the current in the winding $m$, and by means of the resistance H, it is adjusted so that the relay G operates reliably under the actual conditions found. The employment of the rectifiers E1, E2 and E3 provides for D. C. bias energizing of winding $n$ in opposition to the D. C. energized winding $m$ so as to obtain the desired differentially or balanced operation of the relay G with provision for adjustment of its action by means of the resistance H. It is to be noted that the voltage for the bias current is derived from the main supply, and the bias current will therefore vary with the ordinary mains voltage variations so that the margin of operation of the relay G will be substantially unaltered. Also, if one of the phases is disconnected, whether earthed or not, the voltage derived from the three-phase rectifier E is nearly the same as when the three phases are working normally. Thus the bias current does not substantially change on the failure of a phase.

It is to be noted that if the common point 4 of the transformers A, B, C is connected to the neutral conductor of the supply (if available) or to earth, the relay J will still be maintained operated even when only one phase is working, and will only release on a total failure of the supply.

The switch S for disconnecting the load can be arranged to be operated directly or indirectly by the release of either or both of the relays J and G as desired, by providing the relays with appropriate contacts and auxiliary circuits. As shown the phase failure relay G is provided with a movable contact 14 and the mains failure relay J is provided with a movable contact 15; these contacts being connected in series with an energizing circuit for a magnet 16 controlling the switch S and including a supply source 17 as shown. In any case, when the supply is restored to normal, both of these relays will be re-operated and can be arranged to re-close the switch S, if desired, or if preferred, it can be arranged so that the switch is not re-closed automatically on restoration of the supply, but must be reset by hand.

It has been stated above that a voltage operated phase failure indicating arrangement is preferable to a current operated arrangement, and it has been clearly pointed out that the arrangement of the present invention is voltage operated. A current operated arrangement has been previously used employing a third harmonic voltage for controlling a cut-out relay in which the saturable transformers which generate the third harmonic voltage are connected to the supply conductors through additional current transformers, the primary windings of which are connected in series with the supply conductors and therefore insuring that it shall be a current operated arrangement. In the case of the present invention. voltage operation is insured by connecting the harmonic generating transformer in star formation in shunt to the supply conductors, thus incidentally saving three transformers.

What is claimed is:

1. A voltage operated phase failure indicating arrangement for a three phase electric power supply circuit comprising, three primary transformer windings connected in star formation and in shunt to each phase of the supply circuit, three corresponding secondary windings adapted to generate voltages at the third harmonic of the supply frequency, a local circuit including a phase failure relay, means for applying said third harmonic voltages to said local circuit, three additional secondary transformer windings corresponding respectively to said first mentioned secondary windings and connected to produce a resultant voltage at the fundamental frequency and means for applying the voltage from said additional windings to said local circuit whereby said relay is operated upon phase failure of said supply circuit, further comprising a mains failure relay and means for applying said resultant voltage to operate said mains failure relay upon failure of at least two of the phases.

2. An arrangement according to claim 1, comprising means to apply said resultant voltage at the fundamental frequency also to bias the phase failure relay.

3. An arrangement in accordance with claim 2, in which the phase failure relay is provided with a main winding supplied with current from the first mentioned secondary winding, and a bias winding supplied with current from the additional secondary winding.

4. An arrangement in accordance with claim 3, in which means is provided for rectifying the voltage applied to the relay.

5. An arrangement in accordance with claim 4, in which a load is connected to the supply circuit further comprising a switch between said supply circuit and said load and means for automatically operating said switch to disconnect said load upon release of either relay.

VICTOR JOHN TERRY.
RICHARD KELLY.

REFERENCES CITED

The following references are of record in the file of this patent:

UNITED STATES PATENTS

| Number | Name | Date |
| --- | --- | --- |
| 1,298,665 | Chubb | Apr. 1, 1919 |
| 1,526,027 | Traver | Feb. 10, 1925 |
| 1,571,224 | Allcutt | Feb. 2, 1926 |
| 1,646,028 | Lewis et al. | Oct. 18, 1927 |
| 1,691,342 | Evans | Nov. 13, 1928 |
| 1,888,718 | Friedlander | Nov. 22, 1932 |
| 1,929,059 | Fitzgerald | Oct. 3, 1933 |
| 1,980,395 | Fitzgerald | Nov. 13, 1934 |

FOREIGN PATENTS

| Number | Country | Date |
| --- | --- | --- |
| 676,295 | Germany | June 2, 1939 |